(No Model.)
W. E. RUSSELL & M. S. WOODS.
NUT LOCK.
No. 516,382. Patented Mar. 13, 1894.
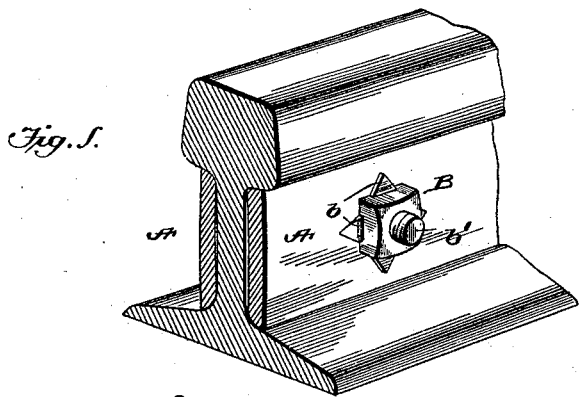
Fig. 1.
Fig. 2.
Fig. 3.
Fig. 4.
Fig. 5.
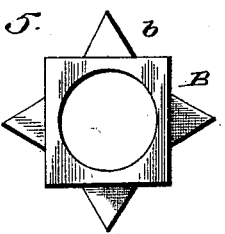
Fig. 6.
Witnesses
John Lawrie
Wm. S. Hodges
Inventors
William E. Russell
Murray S. Woods
By their Attorney
THE NATIONAL LITHOGRAPHING COMPANY,
WASHINGTON, D. C.

UNITED STATES PATENT OFFICE.

WILLIAM ERSKIN RUSSELL, OF ROME, GEORGIA, AND MURRAY STOVER WOODS, OF TECUMSEH, ALABAMA.

NUT-LOCK.

SPECIFICATION forming part of Letters Patent No. 516,382, dated March 13, 1894.

Application filed May 25, 1893. Serial No. 475,482. (No model.)

*To all whom it may concern:*

Be it known that we, WILLIAM ERSKIN RUSSELL, of Rome, in the county of Floyd and State of Georgia, and MURRAY STOVER WOODS, of Tecumseh, in the county of Cherokee and State of Alabama, have invented certain new and useful Improvements in Nut-Locks; and we do hereby declare the following to be a full, clear, and exact description of the invention, such as will enable others skilled in the art to which it appertains to make and use the same.

This invention contemplates certain new and useful improvements in nut locks and is specially designed for locking nuts on threaded rods or bolts of fish-plates, bridge irons, car irons, and nearly all structural work.

The object of the invention is to provide improved simple and efficient means for locking or holding a nut in place, the means employed being inexpensive and very durable.

The invention consists of the details of construction, combination and arrangement of parts substantially as hereinafter fully set forth and particularly pointed out in the claim.

In the accompanying drawings:—Figure 1 is a view in perspective of a portion of a fish plate with a bolt and nut. Fig. 2 is a face view of the fish plate. Fig. 3 is a similar view of a washer plate. Fig. 4 is a longitudinal sectional view on line $x$—$x$, Fig. 2. Figs. 5 and 6 are views of a specially constructed nut.

Referring to the drawings, A designates a fish plate having holes or openings $a$ to accommodate a threaded bolt. From each of these holes or openings extends a recess or elongation $a'$ of approximately V-shape.

B is the nut which is formed with a central threaded opening and a series of lips or flanges $b$ extending from the inner ends of square sides of the nut, said lips corresponding to the recesses $a'$. When the nut is driven "home" on bolt $b'$ so that its lips are in contact with the outer face of the fish-plate and one of the lips is coincident with the recess or elongation $a'$ a blow on said lip with a chisel or hammer will force the same into said recess and thus hold the nut and prevent the loosening or accidental turning thereof. If, however, the special form of nut above described is not employed the same results can be secured by an ordinary nut. After the latter has been screwed home and with one corner in alignment with the recess the operator can by the use of a chisel and hammer cut the corner of the nut and force the lip thus formed into the V-shape recess. The same results can be attained by employing a washer plate, as C, either with or without a fish plate. Said washer is provided with openings $d$ having V-shape elongations $d'$ designed to accommodate the lip or flange of the specially constructed nut, or one formed from an ordinary nut, as above specified.

The advantages attained by our invention are apparent. Where a fish-plate is not provided with the elongated recesses the ordinary nuts can be removed and the washer plate properly positioned, after which the nuts can be reapplied and by forming a lip on one corner of each nut the latter can be rigidly held in place, the lips being forced into said recesses. When the fish-plate is itself constructed as herein described we prefer to use the nuts having the lips or flanges, since said nuts can then be easily fixed in place, a single blow against that one of the lips coincident with the elongated recess serving to hold the nut in place.

The means herein specified for effecting the locking of nuts is simple, inexpensive, strong and durable.

We are aware that it is not broadly new to provide a plate with an opening in which one side of an inclined nut is designed to fit the other side of said nut being in contact with the plate; and that nuts having teeth for fitting corresponding indentures have heretofore been known. But our invention is designed as an improvement in the art. The nut on its sides is provided at its inner end with V-shape lips or flanges one of which is caused to coincide with the V-shape elongation of the opening in the plate and by striking this lip or flange it will fit snugly in said elongation and prevent the accidental turning of the nut. To remove the latter it is necessary to first pry the lip or flange out from the V-shape elongation, when the nut can be readily turned. This cannot be done where the nut itself has been inclined nor where there are a series of teeth to be disengaged from coincident recesses.

We claim as our invention—

The combination of the bolt, the plate having an opening therein provided with a V-shape elongation, and the nut fitted on said bolt and having square sides and V-shape lips or flanges extending from said sides at the inner ends thereof, whereby when one of said lips or flanges is coincident with said V-shape elongation it can be made to fit therein, substantially as set forth.

In testimony whereof we have signed this specification in the presence of two subscribing witnesses.

WILLIAM ERSKIN RUSSELL.
MURRAY STOVER WOODS.

Witnesses to signature of Wm. E. Russell:
J. H. HOSKINSON,
NAT HARRIS.

Witnesses to signature of Murray S. Woods:
IRA F. MCCRAVEY,
W. C. MCCRAVEY.